(12) United States Patent
Liao

(10) Patent No.: US 7,401,966 B2
(45) Date of Patent: Jul. 22, 2008

(54) LIGHT GUIDE PLATE HAVING HIGH-DENSITY DOTS

(75) Inventor: Ming-Yi Liao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 58 days.

(21) Appl. No.: 11/228,641

(22) Filed: Sep. 16, 2005

(65) Prior Publication Data

US 2006/0139957 A1    Jun. 29, 2006

(30) Foreign Application Priority Data

Dec. 29, 2004   (CN) .................. 2004 1 0091912

(51) Int. Cl.
*G02B 6/00* (2006.01)

(52) U.S. Cl. ...................... 362/623; 362/625

(58) Field of Classification Search ............... 362/610, 362/615, 619, 620, 623, 624, 625, 626, 627, 362/628; 349/67
See application file for complete search history.

(56) References Cited

U.S. PATENT DOCUMENTS

| 5,134,549 | A | * | 7/1992 | Yokoyama ............... 362/623 |
| 5,363,294 | A | * | 11/1994 | Yamamoto et al. ......... 362/330 |
| 5,390,436 | A | * | 2/1995 | Ashall ..................... 40/546 |
| 5,394,308 | A | * | 2/1995 | Watanabe et al. ........... 362/613 |
| 5,408,388 | A | * | 4/1995 | Kobayashi et al. .......... 362/613 |
| 5,450,292 | A | * | 9/1995 | Yokoyama et al. .......... 362/613 |
| 5,600,462 | A | * | 2/1997 | Suzuki et al. ............... 349/112 |
| 5,718,497 | A | * | 2/1998 | Yokoyama et al. .......... 362/625 |
| 5,921,651 | A | * | 7/1999 | Ishikawa ................... 362/624 |
| 6,199,994 | B1 | * | 3/2001 | Watai ....................... 362/617 |
| 6,259,854 | B1 | * | 7/2001 | Shinji et al. ................ 385/146 |
| 6,425,673 | B1 | * | 7/2002 | Suga et al. ................. 362/613 |
| 2004/0130883 | A1 | * | 7/2004 | Leu et al. .................. 362/31 |
| 2004/0246743 | A1 | * | 12/2004 | Lee et al. .................. 362/561 |

* cited by examiner

*Primary Examiner*—Jong-Suk (James) Lee
*Assistant Examiner*—Edmund C Kang

(57) ABSTRACT

A light guide plate (10) includes a pair of opposite incidence surfaces (101, 103), an emission surface (108) and a bottom surface (109) opposite to the emission surface. A plurality of dots (11) is distributed on the bottom surface, and each dot is shaped as a rectangle or a square. In a pitch of every two adjacent dots, at least one side of one dot has at least one cutout (111), and at least one side of the other dot has at least one corresponding protrusion (119). This ensures that a clearance between adjacent dots is relatively small, thus, the light guide plate can provide emission of light beams with good uniformity. Furthermore, clearances between adjacent columns of dots are discontinuous, and this can avoid bright lines. Thus, the light guide plate can provide improved display quality. Therefore, the light guide plate can be advantageously applied in back light systems of liquid crystal display devices.

16 Claims, 6 Drawing Sheets

LIGHT GUIDE PLATE HAVING HIGH-DENSITY DOTS

RELATED APPLICATION

This application is related to commonly-assigned applications entitled "LIGHT GUIDE PLATE HAVING HIGH-DENSITY DOTS", application Ser. No. 11/228,678 filed on Sep. 16, 2005, and "LIGHT GUIDE PLATE HAVING HIGH-DENSITY DOTS", application Ser. No. 11/228,944 filed on Sep. 16, 2005.

BACKGROUND

1. Field of the Invention

The invention relates generally to light guide plates used in back light systems of liquid crystal display devices and, more particularly, to a light guide plate having high-density dots.

2. Discussion of Related Art

Back light systems are used in liquid crystal display devices for converting linear light sources, such as cold cathode ray tubes, or point light sources, such as light emitting diodes, into area light sources having high uniformity and brightness.

A conventional back light system includes a light source, a light guide plate, a reflection plate, a diffusion plate and a prism sheet. The light source can be located beside one end or beside two opposite ends of the light guide plate and is used to emit incident light beams into the light guide plate. The light guide plate is used to lead/guide travel of the incident light beams therein and ensure that most of the incident light beams can be emitted from an emission surface thereof. The reflection plate is located below a bottom surface of the light guide plate and is used to reflect some of the incident light beams that are emitted from the bottom surface into the light guide plate. This reflection enhances the utilization ratio of the incident light beams. The diffusion plate and the prism sheet are located on the emission surface of the light guide plate, in turn, and are used to improve uniformity of the emitted light beams.

As shown in FIG. 10, a conventional surface light source device includes a light guide plate 1, a line light source 2, an end edge reflection layer 4, a light diffusion layer 6, a white back-face reflection layer 5, and a curved reflection plate 7. The line light source 2 is positioned on and/or adjacent a first end edge of the light guide plate 1. The end edge reflection layer 4 is provided on and/or adjacent a second end edge of the light guide plate 1, and the light diffusion layer 6 is provided on and/or adjacent a light emitting surface of the light guide plate 1. The white back-face reflection layer 5 is provided on a back surface of the light guide plate 1. The curved reflection plate 7 is further provided to enclose the line light source 2 so as to effectively utilize light beams emitted by the line light source 2.

Furthermore, a light diffusion/transmission section 3 is provided on the back surface of the light guide plate 1. The light diffusion/transmission section 3 is formed by means, for example, of gravure printing, offset printing, and/or screen printing or transfer and, as formed, includes a plurality of dots. The dots can have arbitrary shapes such as round, square or chain dot-shapes and are used to break up what would otherwise be a total reflection condition of the incident light beams. The provision of such dots ensures that most of the light beams can pass through the light-emitting surface of the light guide plate 1.

Referring to FIG. 11, a distribution of the dots on the back surface of the light guide 1 is shown. In a region from the first end edge of the light guide plate 1 to a position at which the surface emission luminance of the light guide plate 1 is lowest, the ratio of dot area of the light diffusion/transmission section 3 to the whole area of the back surface of the light guide plate 1 gradually increases with an increase in distance from the first end edge along a first direction. The first direction is perpendicular to the end edges of the light guide plate 1 and is parallel to the side edges of the light guide plate 1. In a region from the position at which the surface emission luminance of the light guide plate 1 is lowest to the second end edge of the light guide plate 1, the ratio is constant along the first direction. The ratio of the dot area of the light diffusion/transmission section 3 to the whole area of the back surface of the light guide plate 1 is made constant along a second direction perpendicular to the first direction.

The light diffusion/transmission section 3 can enhance, to a certain extent, the uniformity of the emitted light beams from the light guide plate 1. However, two corners of the first end edge of the light guide plate 1 are electroshock areas of the line light source 2, and the brightness of the emitted light beams at the two corners is relatively low. Furthermore, a clearance between adjacent dots of the light diffusion/transmission section 3 is relatively big. That is to say, the distribution density of the dots is relatively small, and, as such, the light diffusion/transmission section 3 can't disperse light beams as effectively as would be desired. Thus, it is difficult to achieve entire uniformity of the emitted light beams from the whole area of the light guide plate 1.

Furthermore, clearances between adjacent columns of dots are straight and tend to produce bright lines in use. Thus, the light guide plate 1 can't provide optimal display quality.

What is needed, therefore, is a light guide plate that can provide emission of light beams with good uniformity.

What is also needed is a light guide plate that can provide an improved display quality.

SUMMARY

In one embodiment, a light guide plate includes a pair of opposite incidence surfaces, an emission surface and a bottom surface opposite to the emission surface. A plurality of dots is distributed on the bottom surface, and each dot is shaped as a rectangle or a square. In a pitch of every two adjacent dots, at least one side of one dot has at least one cutout, and at least one side of the other dot has at least one protrusion corresponding to the cutout. A distribution density of the dots at a middle area of the bottom surface, which is parallel to the incidence surfaces, and a distribution density of the dots at four corners of the bottom surface are larger than that at the other areas of the bottom surface. Each dot at the middle area and the four corners is bigger than each dot located at other areas of the bottom surface.

Compared with a conventional light guide plate, the protrusion corresponds to the cutout. Therefore, a clearance between adjacent dots is relatively small. That is, a distribution of the dots is relatively compact, and this compact distribution ensures that the present light guide plate can readily disperse light beams. Furthermore, the cutout and the protrusion can enhance the utilization ratio of the incident light beams thereby improving the uniformity of the emitted light beams. Thus, the emitted light beams have good uniformity.

Secondly, the distribution density of the dots at the middle area of the bottom surface is relatively large, and each dot thereat is relatively big. This combination of dot distribution density and size further ensures that the light guide plate can disperse light beams effectively. Thus, the uniformity of the emitted light beams is further improved.

Thirdly, the distribution density and the size of the dots at the four corners of the bottom surface are each relatively large, thereby enhancing the brightness of the light beams emitted at the four corners. Thus, the uniformity of the emitted light beams, as a whole, is further improved.

Fourthly, clearances between adjacent columns of dots are discontinuous, and this discontinuity associated with such patterning can help avoid bright lines. Thus, the present light guide plate can help provide an improved display quality. Therefore, the present light guide plate can be advantageously applied, for example, in back light systems of liquid crystal display devices.

Other advantages and novel features will become more apparent from the following detailed description of preferred embodiments when taken in conjunction with the accompanying drawings.

BRIEF DESCRIPTION OF THE DRAWINGS

Many aspects of the present light guide plate can be better understood with reference to the following drawings. The components in the drawings are not necessarily to scale, the emphasis instead being placed upon clearly illustrating the principles of the present light guide plate. Moreover, in the drawings, like reference numerals designate corresponding parts throughout the several views.

Figure 1:
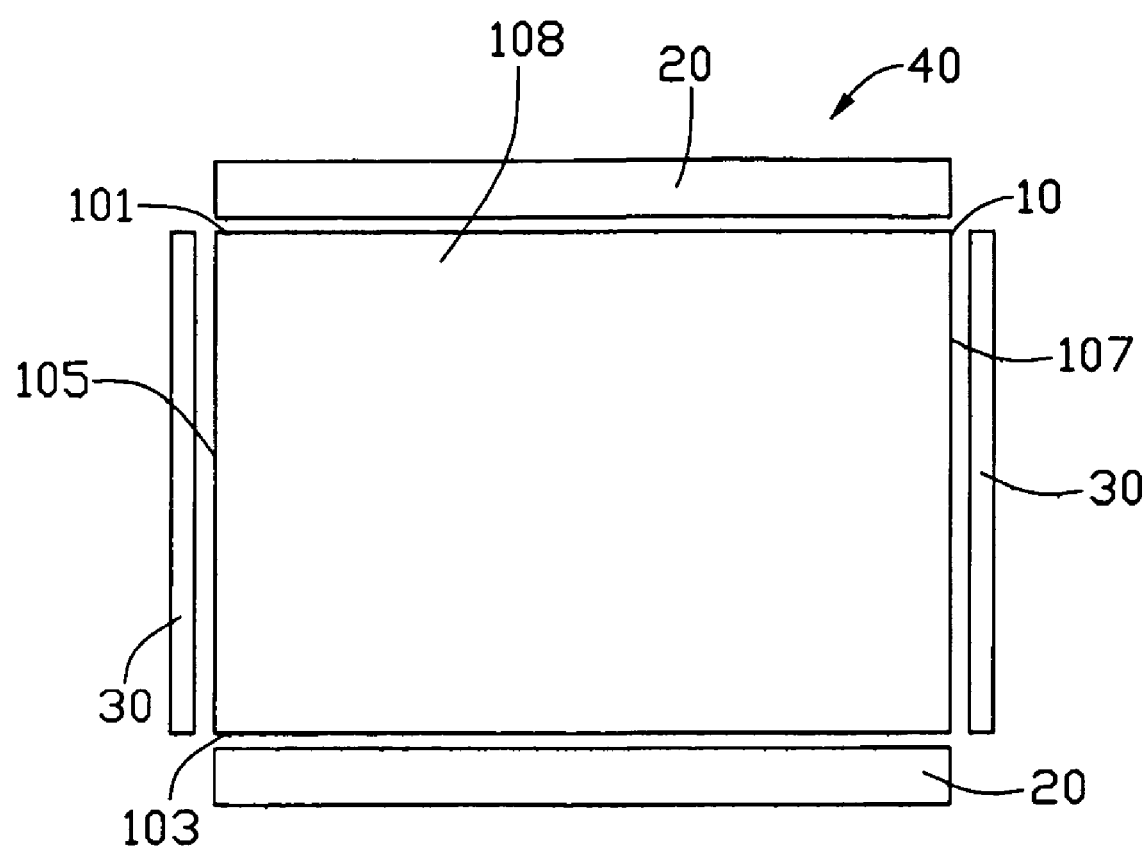
FIG. 1 is a schematic, top view of a light guide plate in accordance with a preferred embodiment of the present device, the light guide plate cooperating with a light source.

Corresponding reference characters indicate corresponding parts throughout the several views. The exemplifications set out herein illustrate at least one preferred embodiment of the present light guide plate, in one form, and such exemplifications are not to be construed as limiting the scope of the invention in any manner.

DETAILED DESCRIPTION OF PREFERRED EMBODIMENTS

Reference will now be made to the drawings to describe embodiments of the present light guide plate in detail.

Figure 2:
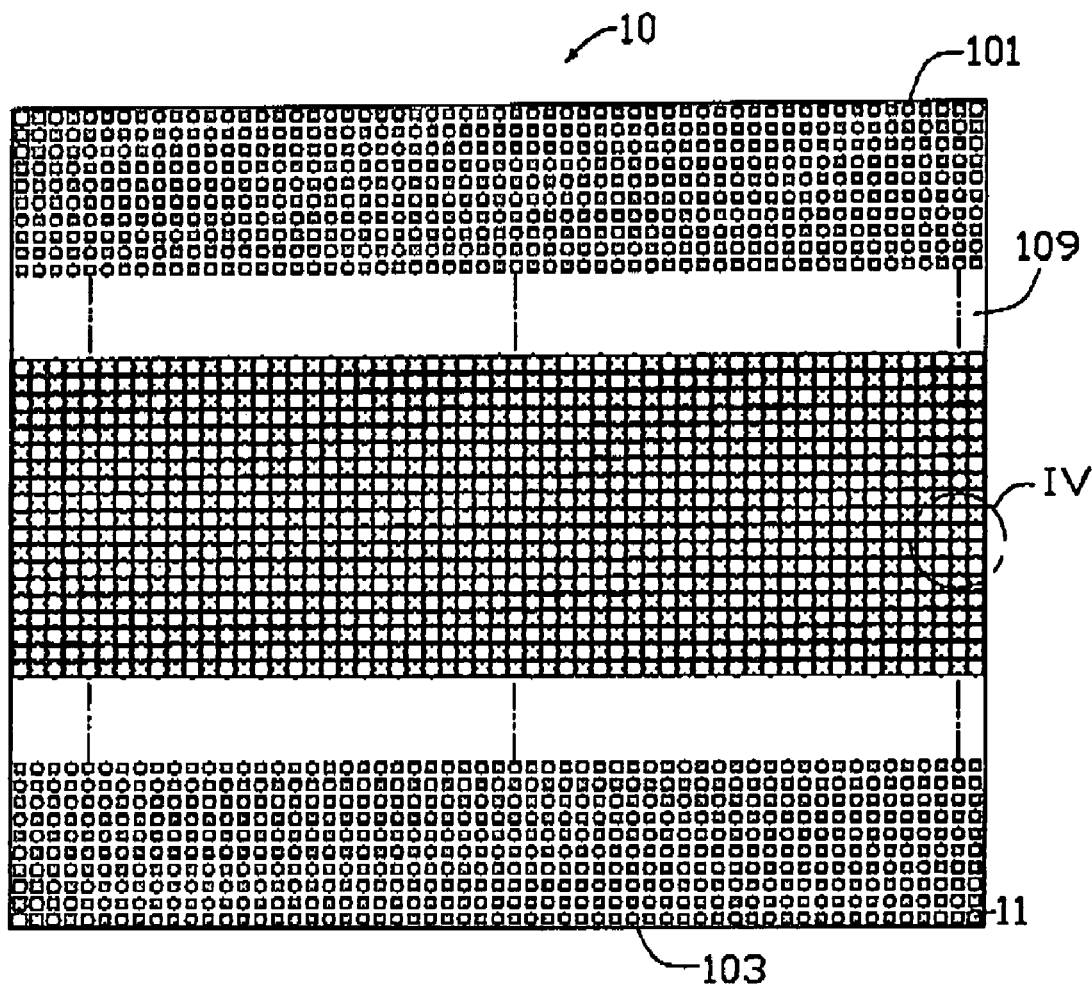
FIG. 2 is a schematic, bottom view of the light guide plate of FIG. 1, showing a plurality of dots distributed on a bottom surface thereof.
Figure 3:
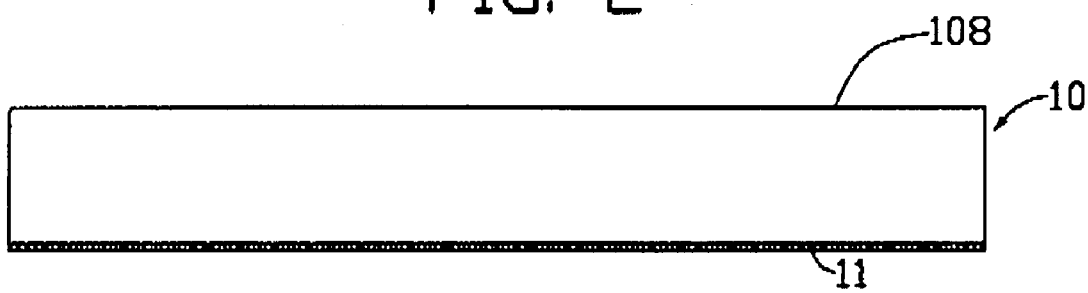
FIG. 3 is a schematic, side view of the light guide plate of FIG. 1.
Figure 4:
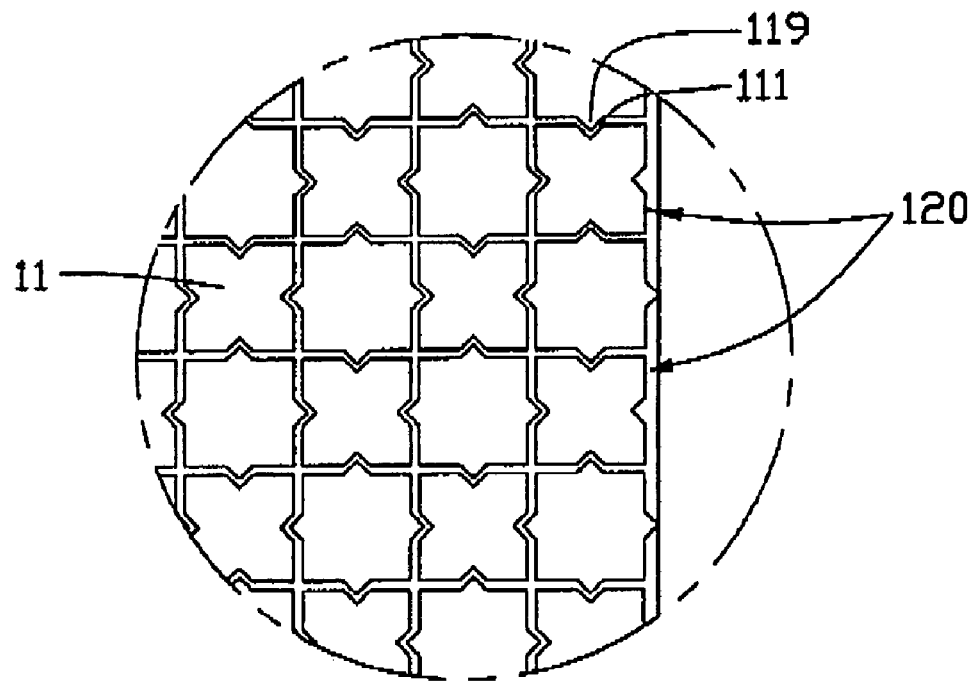
FIG. 4 is a schematic, partly enlarged view of FIG. 2, taken along line IV-IV.

Referring to FIGS. 1-4, in general, and FIGS. 1 and 4, in particular, a light guide plate 10, in accordance with a preferred embodiment of the present device, is flat and includes a pair of opposite incidence surfaces 101, 103, an emission surface 108 and a bottom surface 109 opposite to the emission surface 108. A light source includes a pair of lamps 20 located beside the incidence surfaces 101, 103 respectively.

The light guide plate 10 is made of transparent material, such as acrylic resin, polycarbonate, polyethylene resin or glass. The incidence surfaces 101, 103 are parallel to each other and are used to receive incident light beams emitted from the lamps 20 and lead/guide them into the light guide plate 10. The emission surface 108 and the bottom surface 109 are parallel to each other and perpendicular to the incidence surfaces 101, 103. The emission surface 108 is used to lead/direct emitted light beams out of the light guide plate 10. The light guide plate 10 further has a pair of reflection plates 30 associated therewith. The reflection plates 30 are located beside two side surfaces 105, 107, respectively, of the light guide plate 10. Alternatively, the reflection plates 30 can take the form of reflective films coated on the two side surfaces 105, 107, respectively. The reflection plates 30/reflective films are used to reflect the light beams emitted from the side surfaces 105, 107 back into the light guide plate 10. The light guide plate 10, the lamps 20, and reflection plates/films 30, when considered together, define a lighting device 40.

Referring to FIGS. 2, 3, a plurality of dots 11 are distributed on the bottom surface 109 of the light guide plate 10, for example, by means of printing or injection. Each dot 11 can essentially be rectangular or square, thereby allowing for close packing of dots 11 via rows 120 and/or columns 122. In the preferred embodiment, the dots 11 are square. In a pitch of every two adjacent dots 11, at least one side of one dot 11 has at least one cutout 111, and at least one side of the other dot 11 has at least one protrusion 119 partly received in the corresponding at least one cutout 111. Referring to FIG. 4, in the illustrated embodiment, in a pitch of every two adjacent dots 11, one dot 11 has one cutout 111 formed in every side thereof, and the other dot 11 has one protrusion 119 formed on every side thereof. Each cutout 111 is a symmetrical V-shaped recess and is substantially located in the middle of a given side. A width of the cutout 111 is in the range of about from one twentieth of a length of the side having the cutout 11 to a half thereof. A depth of the cutout 111 is approximately in the range from one twentieth of the length of the side having the cutout 11 to one fourth thereof. In the one preferred embodiment shown in FIG. 4, the width of the cutout 111 is about one tenth of the length of the side having the cutout 11, and the depth of the cutout 111 is about one tenth of the length of the side having the cutout 11. Accordingly, each protrusion 119 has a symmetrical arrow or triangle shape and is substantially located on the middle of the side. A width of the protrusion 119 is in the approximate range from one twentieth of a length of the side having the protrusion 119 to a half thereof A depth or height of the protrusion 119 is about in the range from one twentieth of the length of the side having the protrusion 119 to one fourth thereof In the preferred embodiment shown, the width of the protrusion 119 is approximately one tenth of the length of the side having the protrusion 119, and the depth of the protrusion 119 is about one tenth of the length of the side having the protrusion 119.

When the incident light beams travel to the cutouts 111 and/or the protrusion 119 of the dots 11, the incident light beams are consequently reflected and diffused, thereby traveling along multiple directions and being emitted from the emission surface 108 of the light guide plate 10. This reflection and diffusion of the light, prior to being emitted from the emission surface 108, can enhance the utilization ratio of the incident light beams and can accordingly improve the uniformity of the emitted light beams.

The dots 11 are distributed on the bottom surface in multiple rows and multiple columns. Referring to FIG. 2, a distribution state of the dots 11 at the bottom surface 109 is as follows: a distribution density of the dots 11 at a middle area of the bottom surface 109 which is parallel to the incidence surfaces 101, 103 and a distribution density of the dots 11 at four corners of the bottom surface 109 are each larger than that at other areas of the bottom surface 109. Further, each dot 11 at the middle area and the four corners is bigger than each dot 11 at the other areas. Moreover, as seen in FIG. 2. the distribution density and size of the dots 11 progressively increase with increasing distance from a middle portion of the middle area to two ends of the middle area. Therefore, the brightness of the light beams emitted from the four corners and the middle area is enhanced. Thus, the uniformity of the emitted light beams, as a whole, is further improved.

Figure 5:
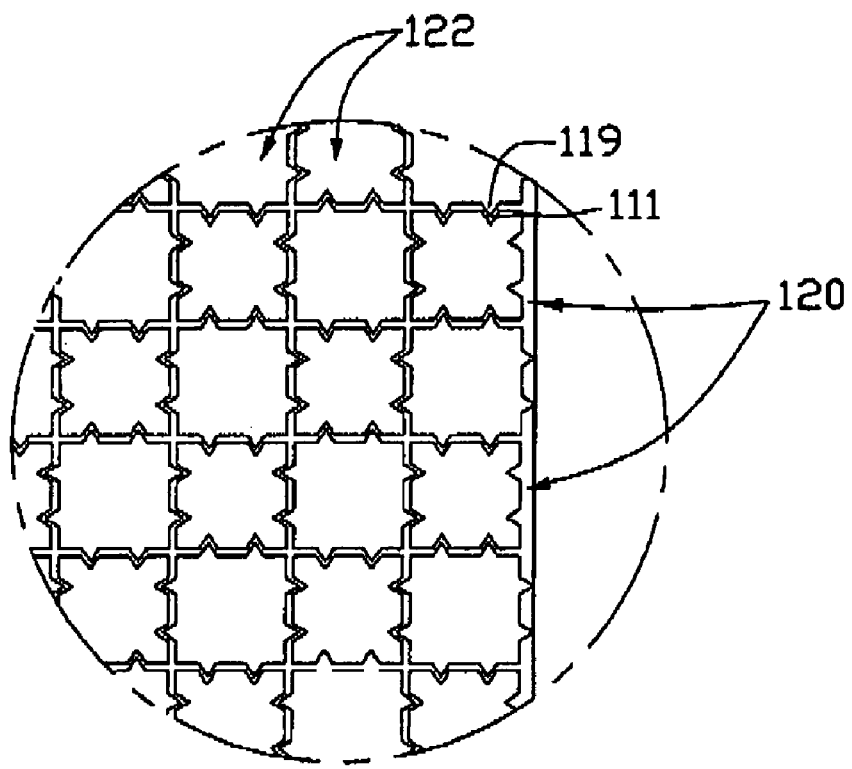
FIG. 5 is a schematic, partly enlarged view of an alternative dot distribution on the light guide plate.
Figure 6:
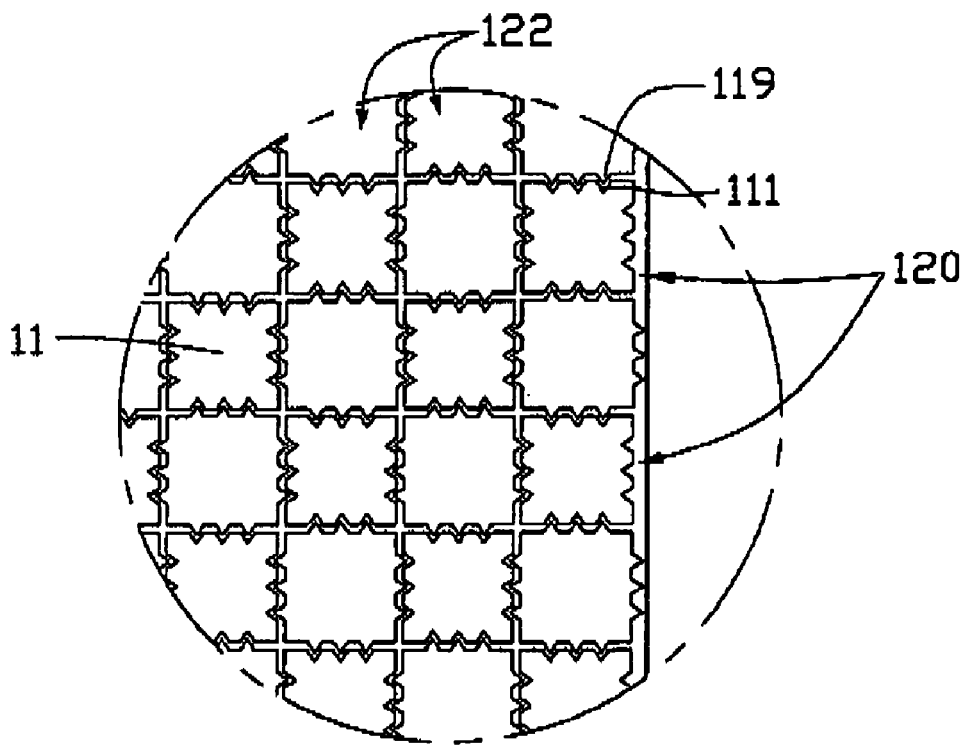
FIG. 6 is a schematic, partly enlarged view of a further alternative dot distribution on the light guide plate.
Figure 7:
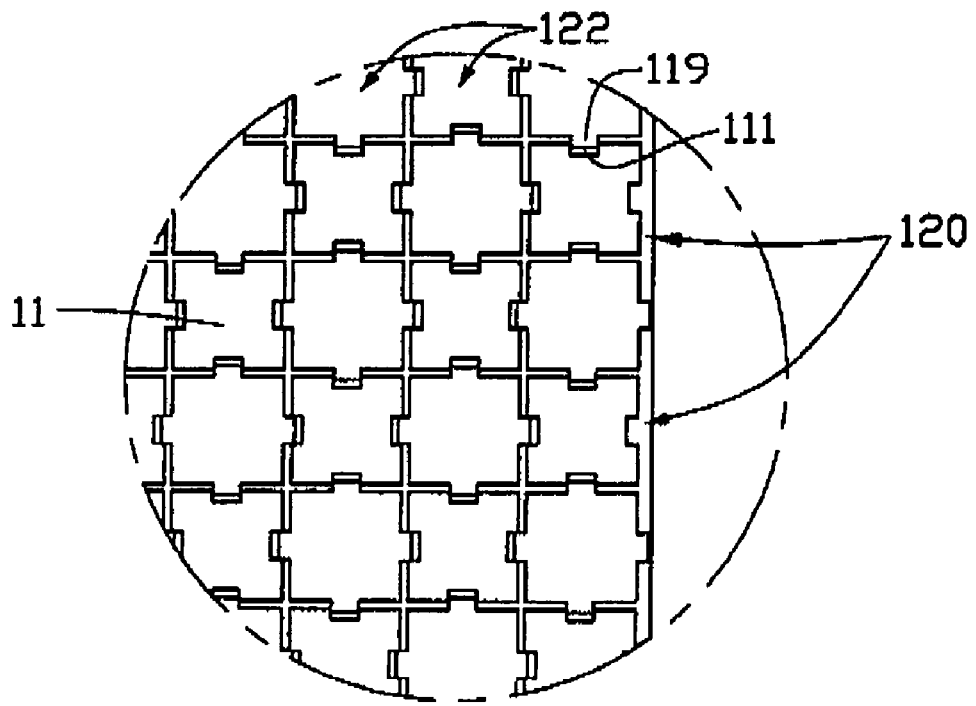
FIG. 7 is a schematic, partly enlarged view of a still further alternative dot distribution on the light guide plate.
Figure 8:
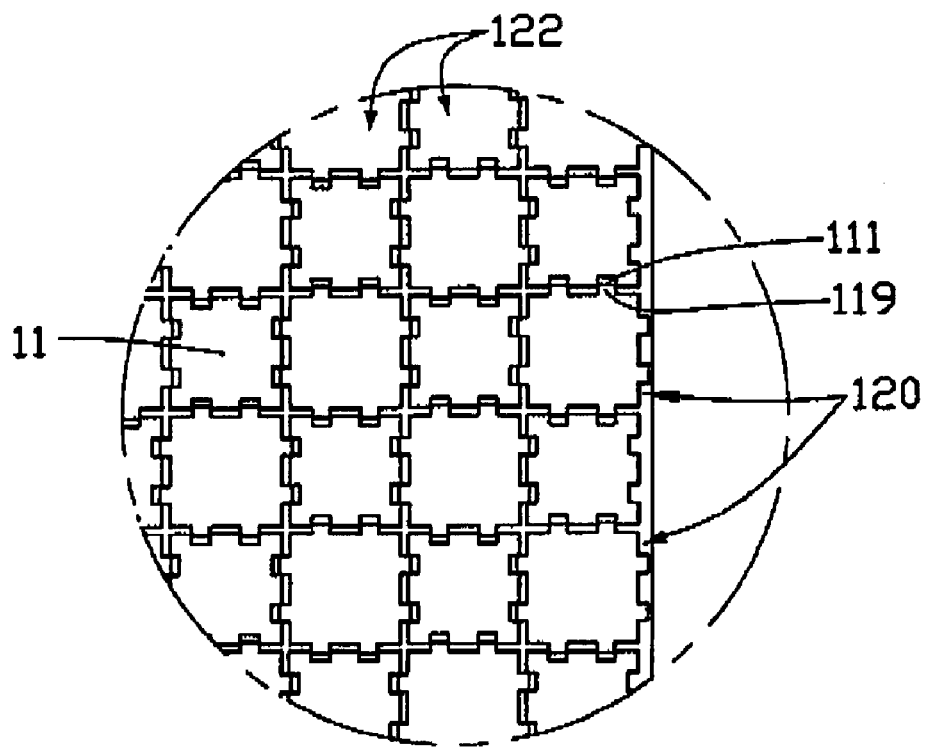
FIG. 8 is a schematic, partly enlarged view of a fifth kind of dot distribution on the light guide plate.
Figure 9:
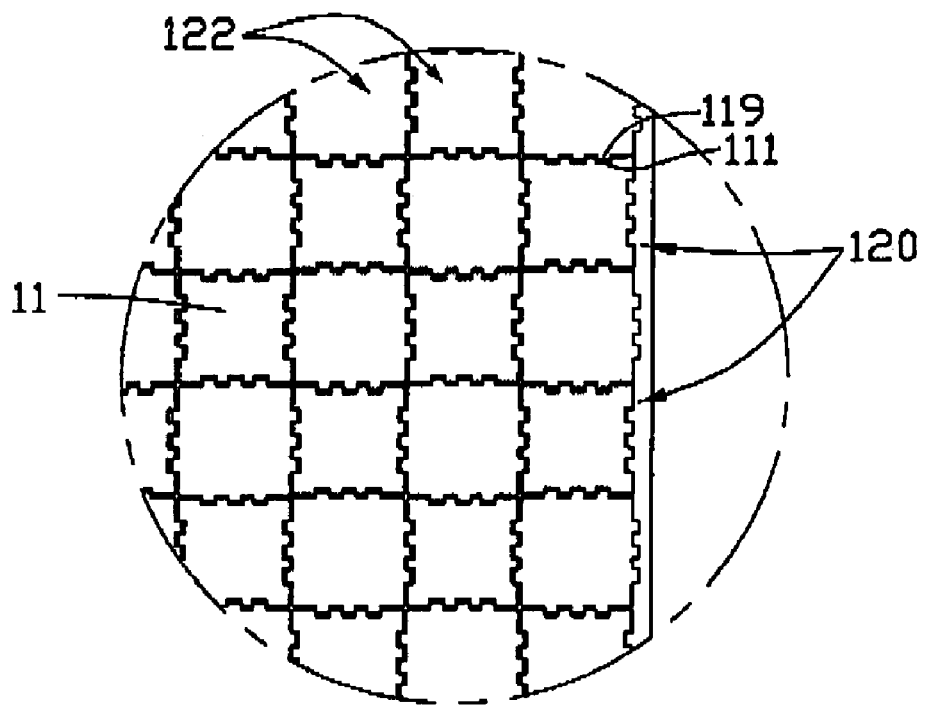
FIG. 9 is a schematic, partly enlarged view of a sixth kind of dot distribution on the light guide plate.
Figure 10:
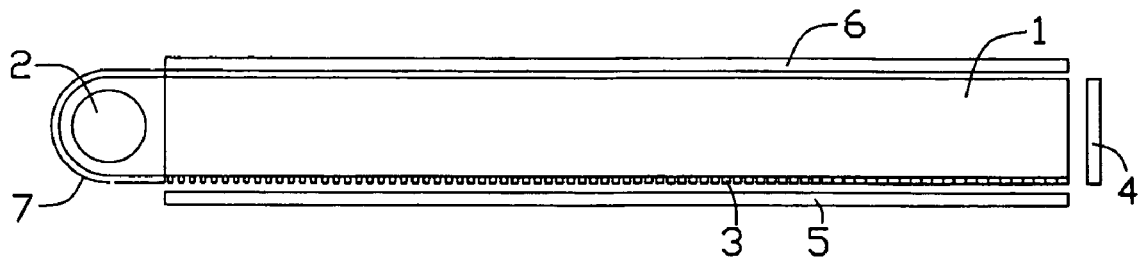
FIG. 10 is a schematic, side view of a conventional surface light source device.
Figure 11:
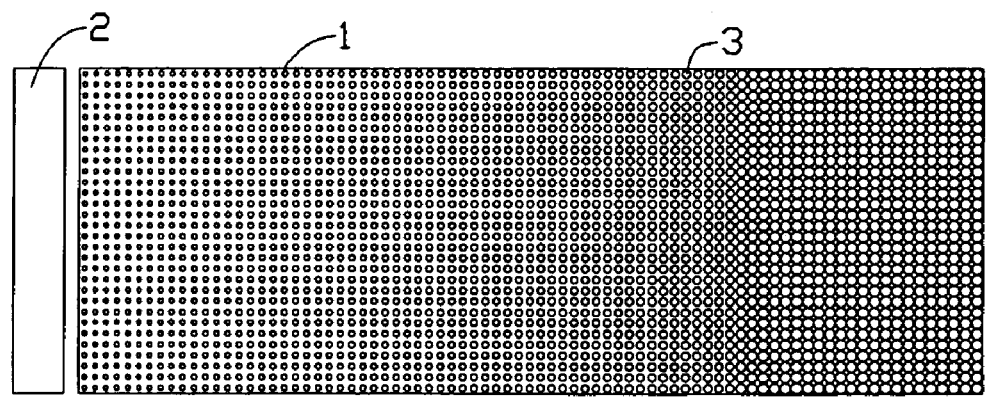
FIG. 11 is a schematic, bottom view of the surface source device of FIG. 10, showing a plurality of dots distributed on a bottom surface of a light guide plate thereof.

Referring to FIG. 5, alternatively, in a pitch of every two adjacent dots 11, one dot 11 has two V-shaped recesses 111 formed in every side thereof, and the other dot 11 has two arrow or triangular shaped protrusions 119 formed on every side thereof. Further alternatively, as shown in FIG. 6, in a pitch of every two adjacent dots 11, one dot 11 has three V-shaped recesses 111 formed in every side thereof, and the other dot 11 has three arrow or triangular shaped protrusions 119 formed on every side thereof. Still further alternatively, as shown in FIG. 7, in a pitch of every two adjacent dots 11, one dot 11 has one rectangular recess 111 formed in every side thereof, and the other dot 11 has one rectangular protrusion 119 formed on every side thereof. Still further alternatively, as shown in FIG. 8, in a pitch of every two adjacent dots 11, one dot 11 has two rectangular recesses 111 formed in every side thereof, and the other dot 11 has two rectangular protrusions 119 formed on every side thereof. Still further alternatively, as shown in FIG. 9, in a pitch of every two adjacent dots 11, one dot 11 has three rectangular recesses 111 formed in every side thereof, and the other dot 11 has three rectangular protrusions 119 formed on every side thereof.

It is to be further understood that, while not specifically illustrated, each dot 11 could instead have one of the following patterns: two sides of each dot 11 having at least a cutout 111, and the other two sides of each same dot 11 having at least a projection 119; every side of each dot II having at least a cutout 111 and at least a projection 119; and still be within the scope of present system.

Compared with a conventional light guide plate, each dot 11 of the present light guide plate 10 is rectangular or square, and every two adjacent dots 11 have mated cutouts 111 and protrusions 119, respectively. As such, a clearance between adjacent dots 11 is relatively small. Accordingly, a distribution of the dots 11 is relatively compact, and this compactness ensures that the light guide plate 10 can disperse light beams in a preferable and effective manner. Furthermore, the cutouts 111 and the protrusion 119 each can enhance the utilization ratio of the incident light beams, thereby improving the uniformity of the emitted light beams.

Secondly, the distribution density of the dots 11 at the middle area of the bottom surface 109 is relatively large, and each dot 11 thereat is relatively big. This dot density and size further ensures that the light guide plate 10 can disperse light beams preferably. Thus, the uniformity of the emitted light beams is further improved.

Thirdly, the distribution density of the dots 11 at the four corners of the bottom surface is relatively large, and each dot 11 thereat is relatively big, thereby enhancing the brightness of the light beams emitted at the four corners. Thus, the uniformity, as a whole, of the emitted light beams is further improved.

Fourthly, clearances between adjacent columns of dots 11 are discontinuous, and this discontinuity can aid the avoidance of bright lines. As a result, the dot patterning of the present light guide plate 10 can help provide improved display quality.

Therefore, the present light guide plate 10, incorporating all or some of the above-mentioned features, can be advantageously applied, for example, in back light systems of liquid crystal display devices.

In addition, the present light guide plate 10 can instead be wedge-shaped, and the dots 11 can be distributed, additionally or alternatively, on the emission surface 108, using any of the various dot distributions discussed previously. Each light source or lamp 20 can, for example, be in the form of an incandescent or fluorescent lamp, a field emission device, a CRT (cathode ray tube), a LED (light emitting diode) or a plurality of LEDs. When the light source 20 is a lamp, a distribution state of the dots 11 at the bottom surface 109 is, advantageously, as follows: a distribution density of the dots 11 at an area near to the lamp 20 is smaller than that at other area far from the lamp 20, and the dots 11 at the area near to the lamp 20 are smaller than those at the other areas that are relatively far from the lamp.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. A light guide plate comprising:
   at least one incidence surface;
   an emission surface;
   a bottom surface opposite to the emission surface; and
   a plurality of dots distributed on the bottom surface, each dot being essentially one of rectangular and square, at least one side of one in every two adjacent dots having at least one cutout and at least one side of the other in every two adjacent dots having at least one protrusion corresponding to the at least one cutout, wherein the at least one protrusion is partly received in the at least one cutout.

2. The light guide plate as claimed in claim 1, wherein the at least one cutout is one of a V-shaped recess and a rectangular recess.

3. The light guide plate as claimed in claim 2, wherein a width of the at least one cutout is in the approximate range of from one twentieth of a length of the side having the at least one cutout to a half thereof, and a depth of the at least one cutout is in the range of about from one twentieth of the length of the side having the at least one cutout to one fourth thereof.

4. The light guide plate as claimed in claim 3, wherein the width of the at least one cutout is about one tenth of the length of the side having the at least one cutout, and the depth of the at least one cutout is about one tenth of the length of the side having the at least one cutout.

5. The light guide plate as claimed in claim 1, wherein the at least one protrusion is one of arrow shaped and rectangular.

6. The light guide plate as claimed in claim 5, wherein a width of the at least one cutout is approximately in the range from one twentieth of a length of the side having the at least one cutout to a half thereof, and a depth of the at least one cutout is in the range of about from one twentieth of the length of the side having the at least one cutout to one fourth thereof.

7. The light guide plate as claimed in claim 6, wherein the width of the at least one cutout is about one tenth of the length of the side having the at least one cutout, and the depth of the at least one cutout is one tenth of the length of the side having the at least one cutout.

8. The light guide plate as claimed in claim 1, wherein the bottom surface has a middle area, the middle area being parallel to the at least one incidence surface, a distribution density of the dots at the middle area being larger than that at another area of the bottom surface, the dots at the middle area being bigger than the dots at the another area of the bottom surface.

9. The light guide plate as claimed in claim 1, wherein a distribution density of the dots at an area new the at least one incidence surface is smaller than that at an area relatively far from the at least one incidence surface, the dots at the area near the at least one incidence surface being smaller than the dots at the area relatively far from the at least one incidence surface.

10. The light guide plate as claimed in claim 1, wherein a distribution density of the dots at four corners of the bottom surface is larger than that at another area of the bottom surface, the dots at the four corners being bigger than the dots at the another area of the bottom surface.

11. The light guide plate as claimed in claim 1, wherein the dots are distributed on the bottom surface in multiple rows and multiple columns.

12. A light guide plate comprising:
at least one incidence surface;
an emission surface;
a bottom surface opposite to the emission surface; and
a plurality of dots distributed an the bottom surface, each dot being essentially one of rectangular and square in shape, the dots being arranged in at least one of rows and columns, at least one pair of adjoining dots having at least one mating pair of a recess and a projection, at least part of the projection received in the recess, the shape and arrangement of the dots thereby being configured for allowing for close packing of the dots.

13. The light guide plate as claimed in claim 12, wherein at least one dot side of one in every two adjacent dots has the at least one recess, at least one dot side of the other in every two adjacent dots having the at least one projection corresponding to the at least one recess.

14. The light guide plate as claimed in claim 13, wherein each recess is one of a V-shaped recess and a rectangular recess.

15. The light guide plate as claimed in claim 13, wherein each projection is one of arrow-shaped and rectangular.

16. The light guide plate as claimed in claim 13, wherein each recess and each projection is formed substantially in the middle of the corresponding at least one dot side.

* * * * *